(12) United States Patent
Wu

(10) Patent No.: US 11,170,218 B2
(45) Date of Patent: Nov. 9, 2021

(54) MOBILE WORK MACHINE CONTROL SYSTEM WITH TERRAIN IMAGE ANALYSIS

(71) Applicant: Deere & Company, Moline, IL (US)

(72) Inventor: Yifu Wu, Naperville, IL (US)

(73) Assignee: Deere & Company, Moline, IL (US)

( * ) Notice: Subject to any disclaimer, the term of this patent is extended or adjusted under 35 U.S.C. 154(b) by 9 days.

(21) Appl. No.: 16/410,646

(22) Filed: May 13, 2019

(65) Prior Publication Data

US 2020/0364455 A1 Nov. 19, 2020

(51) Int. Cl.
*G06K 9/00* (2006.01)
*G06T 7/90* (2017.01)
*G06T 7/60* (2017.01)

(52) U.S. Cl.
CPC ..... *G06K 9/00657* (2013.01); *G06K 9/00664* (2013.01); *G06T 7/60* (2013.01); *G06T 7/90* (2017.01); *G06T 2207/30188* (2013.01)

(58) Field of Classification Search
CPC ............ G01J 3/2823; G01J 2003/2826; G01J 3/2803; G01J 3/36; G01J 3/0297; G01J 2005/0077; G01J 5/0014; G01J 2003/123; G01J 2003/1239; G01J 3/0232; G01J 3/32; G01J 5/0834; G01J 2003/1213; G01J 3/02; G01J 3/0205; G01J 3/0256; G01J 3/12; G01J 3/28; G01N 21/31; G01N 2021/3531; G01N 21/3504; G06K 9/00624; G06K 9/209; G06K 9/00
See application file for complete search history.

(56) References Cited

U.S. PATENT DOCUMENTS

| | | | |
|---|---|---|---|
| 10,025,983 B2 | 7/2018 | Guan | |
| 10,139,797 B2 | 11/2018 | Mewes | |
| 10,497,129 B1* | 12/2019 | Cui | ............ G06K 9/4661 |
| 2011/0200225 A1* | 8/2011 | Kukshya | ............ G06K 9/0063 382/103 |
| 2012/0296529 A1* | 11/2012 | Peake | ............ A01B 69/008 701/50 |
| 2016/0132748 A1* | 5/2016 | Tillotson | ............ H04N 5/23229 348/222.1 |
| 2017/0357267 A1* | 12/2017 | Foster | ............ A01B 69/008 |

OTHER PUBLICATIONS

European Search Report issued in counterpart application No. 20173507.3 dated Oct. 14, 2020 (11 pages).

(Continued)

*Primary Examiner* — Alex Kok S Liew
(74) *Attorney, Agent, or Firm* — Christopher J. Volkmann; Kelly, Holt & Christenson, PLLC

(57) ABSTRACT

A method of controlling a mobile work machine includes receiving an image of spectral response at an area of terrain corresponding to a path of the mobile work machine, generating an image distance metric based on a distance between the spectral response and a base spectral response model corresponding to the terrain, comparing the image distance metric to a distance threshold, and controlling a controllable subsystem of the mobile work machine based on the comparison.

18 Claims, 11 Drawing Sheets

(56) References Cited

OTHER PUBLICATIONS

Ross Patrick et al.: "Novelty-based visual obstacle detection in agriculture", 2014 IEEE International Conference on Robotics and Automation (ICRA), IEEE, May 31-Jun. 7, 2014, pp. 1699-1705, DOI: 10.1109/ICRA.2014.6907080.

Karlsen R E et al.: "Terrain understanding for robot navigation", Proceedings of the 2007 IEEE/RSJ International Conference on Intelligent Robots and Systems, IEEE, Piscataway, NJ, USA, Oct. 29-Nov. 2, 2007, pp. 895-900.

A. L. Rankin et al.: "Passive sensor evaluation for unmanned ground vehicle mud detection", Journal of Field Robotics, pp. 1-24.

\* cited by examiner

MOBILE WORK MACHINE CONTROL SYSTEM WITH TERRAIN IMAGE ANALYSIS

FIELD OF THE DESCRIPTION

The present description generally relates to mobile work machines. More specifically, but not by limitation, the present description relates to terrain image analysis for controlling an agricultural machine, such as a combine harvester.

BACKGROUND

There are a wide variety of different types of mobile work machines. They include machines such as construction machines, turf management machines, forestry machines, agricultural machines, etc.

During work operations, the machines utilize traction units, including wheels, tracks, etc., driven by propulsion systems to traverse over a terrain consisting of varying soil conditions, which can adversely affect operation of the machine.

For instance, in an example agricultural operation, a harvester (e.g., combine harvester, forage harvester, cotton harvester, sugarcane harvester) traverses over a field to harvest crops. The machine may encounter areas of standing water or mud that may cause the machine to become stuck.

The discussion above is merely provided for general background information and is not intended to be used as an aid in determining the scope of the claimed subject matter.

SUMMARY

A method of controlling a mobile work machine includes receiving an image of spectral response at an area of terrain corresponding to a path of the mobile work machine, generating an image distance metric based on a distance between the spectral response and a base spectral response model corresponding to the terrain, comparing the image distance metric to a distance threshold, and controlling a controllable subsystem of the mobile work machine based on the comparison.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
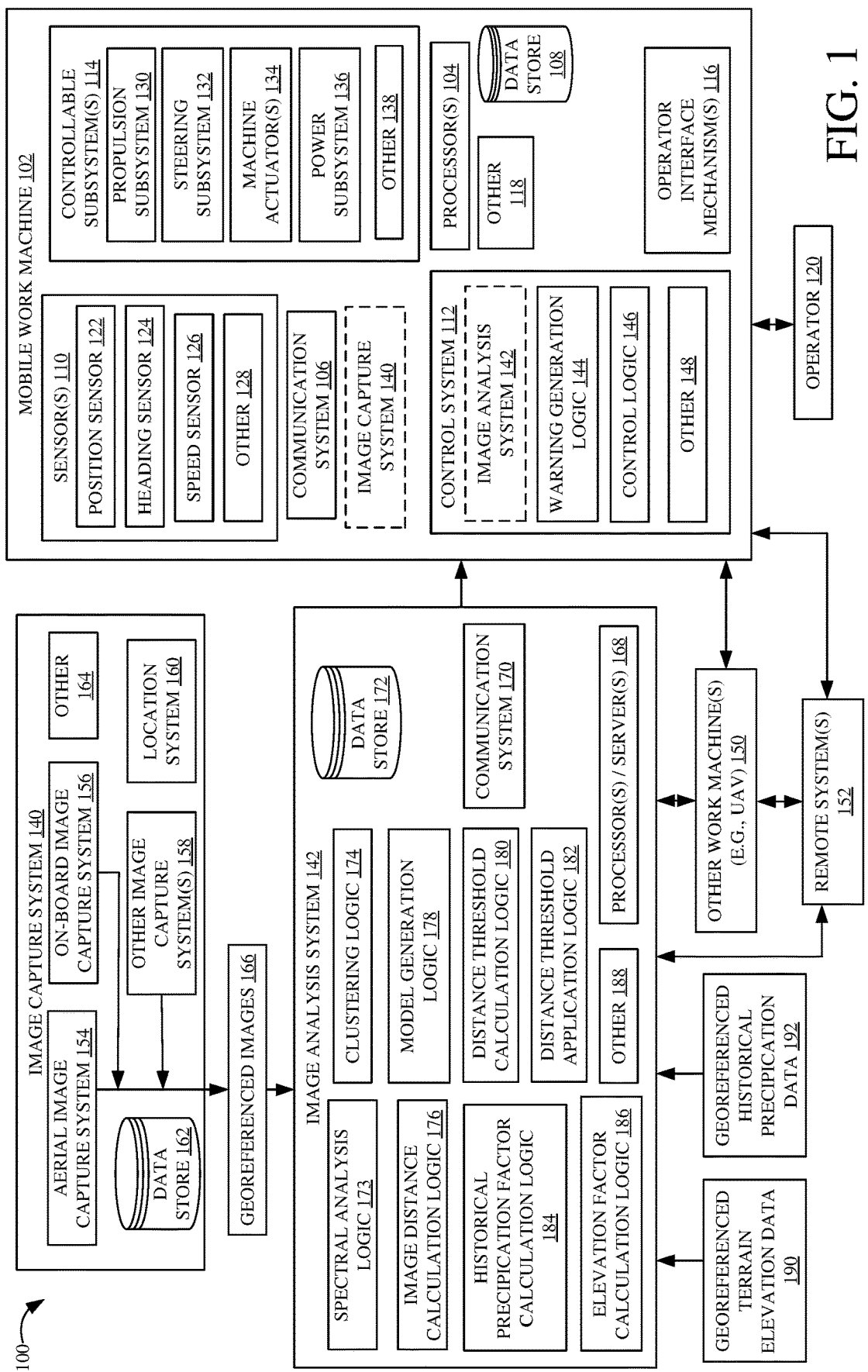
FIG. 1 is a block diagram showing one example of a computing system architecture that includes a mobile work machine.

FIG. 1 is a block diagram showing one example of a computing system architecture 100 in which a mobile work machine 102 is deployed. Mobile work machine 102 can comprise any of a variety of different types of mobile work machines, such as those discussed above. For example, work machine 102 can comprise a construction machine, a turf management machine, a forestry machine, or other type of machine. In the illustrated example, but not by limitation, mobile work machine 102 comprises an agricultural machine configured to perform an agricultural operation while traversing over a terrain. For sake of illustration, but not by limitation, mobile work machine 102 will be described in the context of a combine that performs a harvesting operation while traveling over a field. An example of a combine is discussed below with respect to FIG. 2.

Briefly, machine 102 includes one or more processors 104, a communication system 106, a data store 108, a set of sensors 110, a control system 112, controllable subsystems 114, operator interface mechanisms 116, and can include a wide variety of other items 118. Operator 120 interacts with operator interface mechanisms 116 in order to control and manipulate machine 102. Therefore, the operator interface mechanisms 116 can include levers, a steering wheel, joysticks, buttons, pedals, linkages, etc. Where mechanisms 116 include a touch sensitive display screen, then they can also include operator actuatable elements, such as links, icons, buttons, etc. that can be actuated using a point and click device or touch gestures. Where mechanisms 116 include speech processing functionality, then they can include a microphone, a speaker, and other items for receiving speech commands and generating synthesized speech outputs. They can include a wide variety of other visual, audio and haptic mechanisms.

Sensors 110 can include a position sensor 122, a heading sensor 124, a speed sensor 126, and can include other sensors 128 as well. Position sensor 122, as discussed in further detail below, is configured to generate a signal indicative of the geographic position of machine 102. For instance, position sensor 122 can comprise a global positioning system (GPS) sensor, or other suitable sensor for detecting the current position of machine 102. Heading sensor 124 generates a signal indicative of a heading or route which machine 102 is taking, and speed sensor 126 is configured to generate a signal indicative of a current speed of machine 102.

Controllable subsystems 114 can include a propulsion system 130, a steering subsystem 132, machine actuators 134, a power subsystem 136, and can include other controllable subsystems 138 as well. Propulsion system 130 can include an engine or other power source that controls propulsion of machine 102. Steering subsystem 132 can include actuators that can be actuated to steer machine 102. Machine actuators 134 can include any of a wide variety of different types of actuators that can be used to change machine settings, change machine configuration, raise and lower structural elements (such as a header in the case of a combine), change different subsystem speeds, etc. Power subsystem 248 can be used to control the power utilization of machine 102. It can be used to control how much power is allocated to different subsystems, etc.

Figure 2:
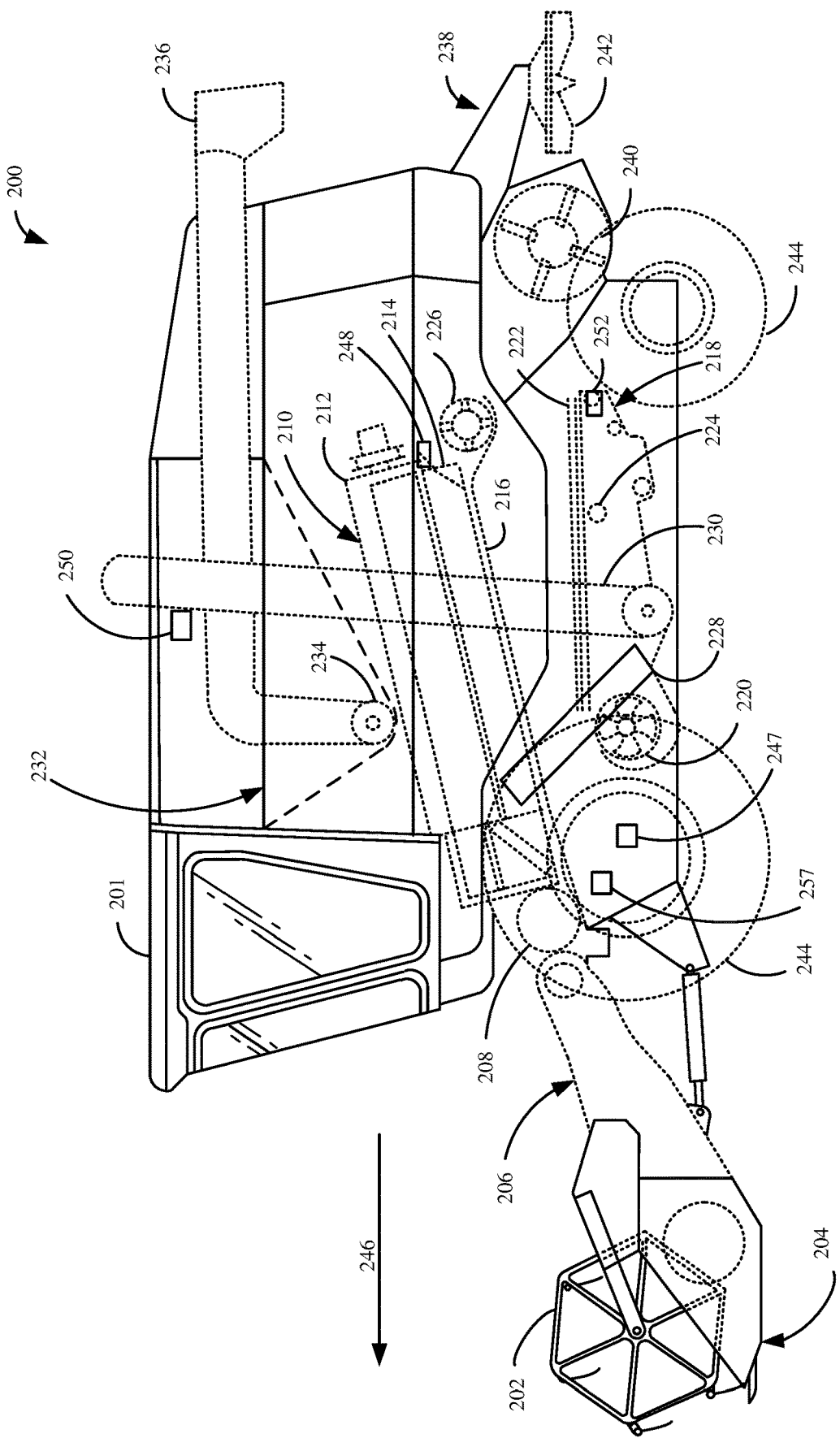
FIG. 2 is a partial pictorial, partial schematic illustration of one example of a mobile work machine in the form of a combine harvester.

FIG. 2 is a partial pictorial, partial schematic, illustration of one of example of an agricultural machine 200, in an example where machine 200 is a combine harvester (or combine). It can be seen in FIG. 2 that combine 200 illustratively includes an operator compartment 201, which can have a variety of different operator interface mechanisms, for controlling combine 200, as will be discussed in more detail below. Combine 200 can include a set of front end equipment that can include header 202, and a cutter generally indicated at 204. It can also include a feeder house 206, a feed accelerator 208, and a thresher generally indicated at 210. Thresher 210 illustratively includes a threshing rotor 212 and a set of concaves 214. Further, combine 200 can include a separator 216 that includes a separator rotor. Combine 200 can include a cleaning subsystem (or cleaning shoe) 218 that, itself, can include a cleaning fan 220, chaffer 222 and sieve 224. The material handling subsystem in combine 200 can include (in addition to a feeder house 206 and feed accelerator 208) discharge beater 226, tailings elevator 228, clean grain elevator 230 (that moves clean grain into clean grain tank 232) as well as unloading auger 234 and spout 236. Combine 200 can further include a residue subsystem 238 that can include chopper 240 and spreader 242. Combine 200 can also have a propulsion subsystem that includes an engine (or other power source) that drives ground engaging wheels 244 or tracks, etc. It will be noted that combine 200 may also have more than one of any of the subsystems mentioned above (such as left and right cleaning shoes, separators, etc.).

In operation, and by way of overview, combine 200 illustratively moves through a field in the direction indicated by arrow 246. As it moves, header 202 engages the crop to be harvested and gathers it toward cutter 204. After it is cut, it is moved through a conveyor in feeder house 206 toward feed accelerator 208, which accelerates the crop into thresher 210. The crop is threshed by rotor 212 rotating the crop against concave 214. The threshed crop is moved by a separator rotor in separator 216 where some of the residue is moved by discharge beater 226 toward the residue subsystem 238. It can be chopped by residue chopper 240 and spread on the field by spreader 242. In other implementations, the residue is simply dropped in a windrow, instead of being chopped and spread.

Grain falls to cleaning shoe (or cleaning subsystem) 218. Chaffer 222 separates some of the larger material from the grain, and sieve 224 separates some of the finer material from the clean grain. Clean grain falls to an auger in clean grain elevator 230, which moves the clean grain upward and deposits it in clean grain tank 232. Residue can be removed from the cleaning shoe 218 by airflow generated by cleaning fan 220. That residue can also be moved rearwardly in combine 200 toward the residue handling subsystem 238.

Tailings can be moved by tailings elevator 228 back to thresher 210 where they can be re-threshed. Alternatively, the tailings can also be passed to a separate re-threshing mechanism (also using a tailings elevator or another transport mechanism) where they can be re-threshed as well.

FIG. 2 also shows that, in one example, combine 200 can include ground speed sensor 247, one or more separator loss sensors 248, a clean grain camera 250, and one or more cleaning shoe loss sensors 252. Ground speed sensor 247 illustratively senses the travel speed of combine 200 over the ground. This can be done by sensing the speed of rotation of the wheels, the drive shaft, the axel, or other components. The travel speed and position of combine 200 can also be sensed by a positioning system 257, such as a global positioning system (GPS), a dead reckoning system, a LORAN system, or a wide variety of other systems or sensors that provide an indication of travel speed.

Cleaning shoe loss sensors 252 illustratively provide an output signal indicative of the quantity of grain loss by both the right and left sides of the cleaning shoe 218. In one example, sensors 252 are strike sensors (or impact sensors) which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 252 can comprise only a single sensor as well, instead of separate sensors for each shoe.

Separator loss sensor 248 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 248 may also comprise only a single sensor, instead of separate left and right sensors.

It will also be appreciated that sensor and measurement mechanisms (in addition to the sensors already described) can include other sensors on combine 200 as well. For instance, they can include a residue setting sensor that is configured to sense whether machine 200 is configured to chop the residue, drop a windrow, etc. They can include cleaning shoe fan speed sensors that can be configured proximate fan 220 to sense the speed of the fan. They can include a threshing clearance sensor that senses clearance between the rotor 212 and concaves 214. They include a threshing rotor speed sensor that senses a rotor speed of rotor 212. They can include a chaffer clearance sensor that senses the size of openings in chaffer 222. They can include a sieve clearance sensor that senses the size of openings in sieve 224. They can include a material other than grain (MOG) moisture sensor that can be configured to sense the moisture level of the material other than grain that is passing through combine 200. They can include machine setting sensors that are configured to sense the various configurable settings on combine 200. They can also include a machine orientation sensor that can be any of a wide variety of different types of sensors that sense the orientation or pose of combine 200. Crop property sensors can sense a variety of different types of crop properties, such as crop type, crop moisture, and other crop properties. They can also be configured to sense characteristics of the crop as they are being processed by combine 200. For instance, they can sense grain feed rate, as it travels through clean grain elevator 230. They can sense yield as mass flow rate of grain through elevator 230, correlated to a position from which it was harvested, as indicated by position sensor 257, or provide other output signals indicative of other sensed variables. Some additional examples of the types of sensors that can be used are described below.

Also, it will be noted that FIG. 2 shows only one example of machine 200. Other machines, such as forage harvesters, cotton harvesters, sugarcane harvesters, etc. can be used as well.

Referring again to FIG. 1, in operation, machine 102 is controlled by operator 120 to traverse across a field or other terrain. Machine 102 may encounter inconsistent terrain conditions or types that may adversely affect operation of machine 102. For instance, in the case of a combine harvester that is being used to harvest row crops, machine 102 may encounter standing water and/or mud between the rows that can cause the wheels (or tracks or other ground engaging traction elements) of machine 102 to become stuck. Further, these adverse terrain conditions may be obscured from the operator's view, so that the operator is unaware of the terrain conditions in the path ahead of machine 102.

Architecture 100 includes features configured to detect changes in the terrain conditions, so that the operator is alerted or machine 102 is otherwise controlled. As shown in FIG. 1, an image capture system 140 is configured to capture images of an area of terrain in a path of machine 102 (i.e., ahead of machine 102 in its direction of travel) and an image analysis system 142 is configured to analyze those captured images, to detect changes in terrain that are used to generate control signals for machine 102. In the example discussed in further detail below, the result of the image analysis indicates the presence of standing water, muddy soil, or other adverse terrain condition that may cause machine 102 to become stuck or otherwise adversely affect the performance of machine 102. The image analysis compares the image to a baseline model to detect a difference of the terrain from a normal or expected terrain condition (e.g., normal, unsaturated soil).

Control system 112 illustratively includes warning generation logic 144 configured to generate a warning indicator or alert to operator 120, to indicate the detected terrain condition. Control logic 146 is configured to control subsystems 114 based on the detected terrain condition. Control system 112 can include other items 148 as well.

Before discussing systems 140 and 142 in further detail, it is noted that they are shown in FIG. 1 as separate blocks for the sake of illustration only. One or both of systems 140 and 142 (or parts thereof) can be implemented on machine 102. This is indicated by the dashed blocks 140 and 142. Alternatively, or in addition, one or both of systems 140 and 142 (or parts thereof) can be implemented on another work machine 150 and/or a remote system 152.

One example of machine 150 comprises an unmanned aerial vehicle (UAV) (or a manned aerial vehicle) that carries components of image capture system 140 to capture the images of the terrain in the path of machine 102. One example of remote system 152 comprises a remote server that receives captured images from image capture system 140, analyzes the images, and provides corresponding data and signals to machine 102. These, of course, are examples only.

As mentioned above, image capture system 140 is configured to capture one or more images of the area under consideration (i.e., the portion of the field in the path of machine 102). The captured images represent a spectral response captured by image capture system 140 that are provided to image analysis system 142 and/or stored in data store 162.

Image capture system 140 can include one or more of an aerial image capture system 154, an on-board image capture system 156, and/or other image capture systems 158. System 140 also includes a location system 160, a data store 162, and can include other items 164 as well.

An example of aerial image capture system 154 includes a camera or other imaging component carried on a UAV. An example of on-board image capture system 156 includes a camera (or other imaging component) mounted on, or otherwise carried by, machine 102. An example of image capture system 158 includes a satellite imaging system.

Location system 160 is configured to generate a signal indicating a geographic location associated with the captured image. For example, location system 160 can output GPS coordinates, that are associated with the captured image to obtain geo-referenced images 166, that are provided to image analysis system 142.

Image analysis system 142 illustratively includes one or more processors or servers 168, a communication system 170, a data store 172, spectral analysis logic 173, clustering logic 174, image distance calculation logic 176, model generation logic 178, distance threshold calculation logic 180, distance threshold application logic 182, historical precipitation factor calculation logic 184, elevation factor calculation logic 186, and can include other items 188 as well.

Communication system 170 can be a system that is configured to communicate over a wide area network, a local area network, a near field communication network, a cellular communication network, or any other of a wide variety of different networks or combinations of networks.

Communication system 170 is configured to communicate with image capture system 140 to receive captured images with associated location information (i.e., georeferenced images 166) and to communicate with mobile work machine 102 to send image analysis results and/or control signals to machine 102. Further, communication system 170 can also be configured to communicate with other work machine(s) 150 and remote system(s) 152. Further, communication system 170 illustratively receives geo-referenced terrain elevation data 190, and geo-referenced historical precipitation data 192. As discussed in further detail below, geo-referenced terrain elevation data 190 is indicative of a relative elevation of the terrain under consideration, relative to the adjacent or surrounding terrain. For instance, geo-referenced terrain elevation data 190 can be utilized to determine the relative elevation of a portion of a field relative to the average elevation for the entire field.

Thus, data 190 can be utilized to determine a relative elevation of the terrain captured in the image, relative to the surrounding terrain, i.e., to determine whether the area of terrain in the image has a higher elevation than an average elevation for the field (and thus less likely to accumulate water) or has a lower elevation relative to the average elevation of the field (and thus more likely to accumulate water).

Data 190 can be obtained from a wide variety of different sources. For instance, terrain elevation data can be obtained from remote system 152, in the form of GPS elevation maps. Alternatively, or in addition, machine 102 and/or machine 150 can include sensors configured to detect the elevation of the terrain.

Geo-referenced historical precipitation data comprises an indication of precipitation amounts in a time period prior to the agricultural operation being performed by machine 102. This can include precipitation totals from one or more days prior to the current day of the agricultural operation. This is discussed in further detail below. Again, this data can be obtained from remote system 152, or otherwise.

Once the geo-referenced images 166 are received by image analysis system 142, spectral analysis logic 173 performs spectral analysis on the images. For example, analysis of the image can obtain color image data, such as red-green-blue (RGB) color data, CMYK color data, HSV color data, or image data in other color spaces.

In the present example, but not by limitation, image processing will be discussed in the context of using RGB color vectors. RGB color data refers to a color model in which red, green and blue light (or signals or data representative thereof) are combined to represent other colors. Each pixel or group of pixels of the collected image data may be associated with an image parameter level or a corresponding pixel value or aggregate pixel value. Thus, each pixel stands for one discreet location in the image and stores data for three channels (red, green, and blue) to represent a certain color. The image parameter level is an indicator of or a measure of an image parameter that is observed, reflected and/or emitted from one or more objects or any other portion of one or more objects within the image.

Clustering logic 174 is configured to cluster pixel values of the captured image to generate a base color vector and/or averaged color vector for the captured image. This is discussed in further detail below.

Image distance calculation logic 176 is configured to calculate a distance between an image color vector, generated for the received image, relative to a base color vector generated by model generation logic 178. Thus, the distance represents a deviation, in the RGB color space, between pixel(s) of the captured image relative to the base color vector. A distance threshold is calculated by distance threshold calculation logic 180. The distance threshold can be a pre-defined distance value and/or can be dynamically updated during operation of architecture 100. In any case, distance threshold application logic 182 applies the distance threshold by comparing the image distance calculated by logic 176 to the distance threshold calculated by logic 180.

Based on a determination as to whether the calculated image distance exceeds the distance threshold, control system 112 controls mobile work machine 102, for example to render a warning using logic 144 and/or control one or more subsystems 114 using control logic 146.

In one example, logic 184 generates an historical precipitation factor based on the historical precipitation data 192. Similarly, elevation factor calculation logic 186 generates an elevation factor based on the terrain elevation data 190. The factors generated by logic 184 and 186 can be applied to the distance calculation before the threshold comparison. This weighting accounts for an increased (or decreased) likelihood that the image represents standing water or mud (or other terrain characteristic deviation) based on recent precipitation and/or the terrain elevation characteristics. To illustrate, if rain was detected in the previous day(s), and the relative elevation of the terrain in the image is low (relative to the surrounding terrain), the image is more likely to represent standing water or muddy conditions. Accordingly, the terrain elevation factor and historical precipitation factor increase the distance calculation, to which the threshold is applied.

Figure 3:
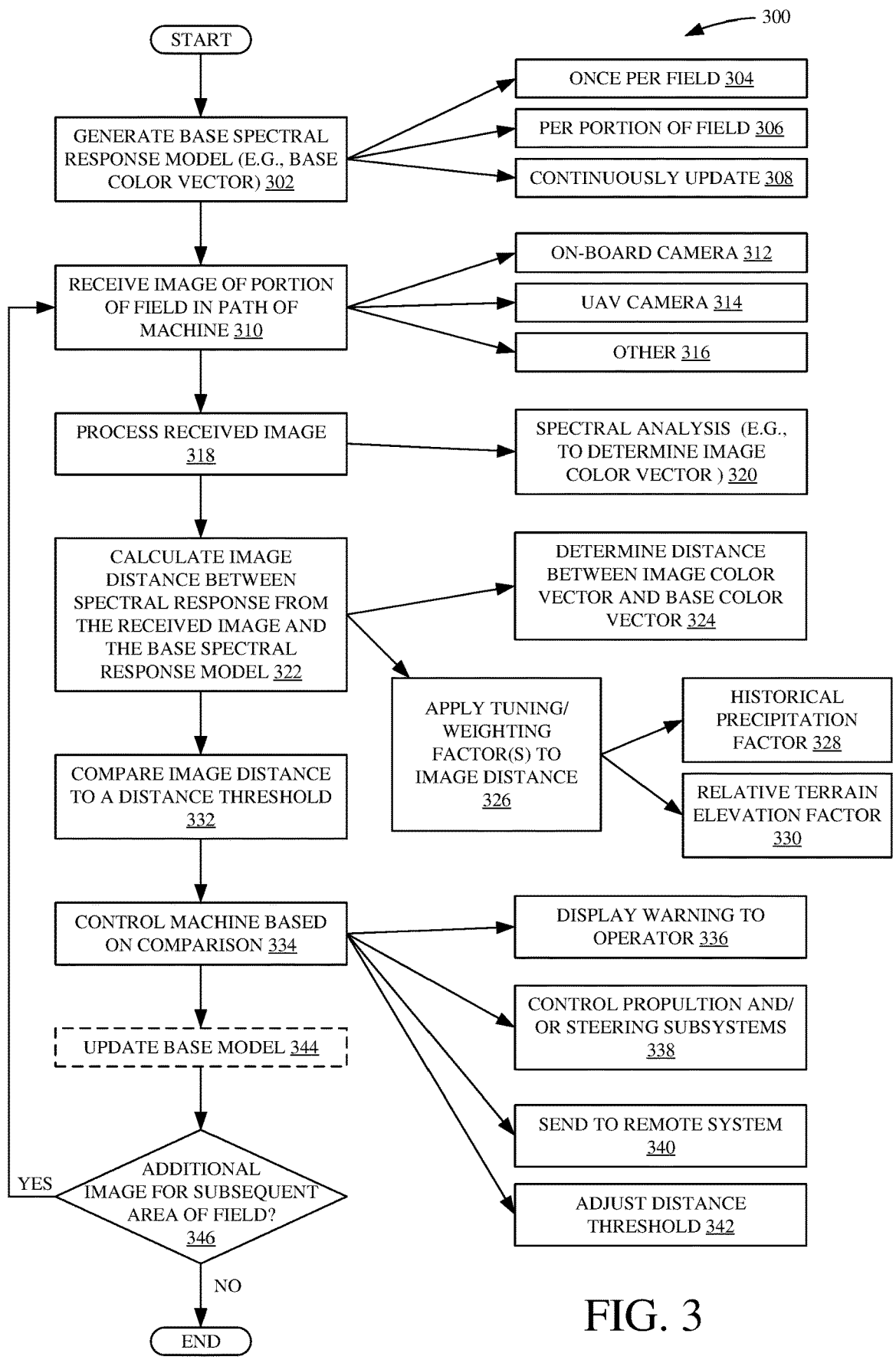
FIG. 3 is a flow diagram of an example method performed by the architecture shown in FIG. 1.
Figure 4:
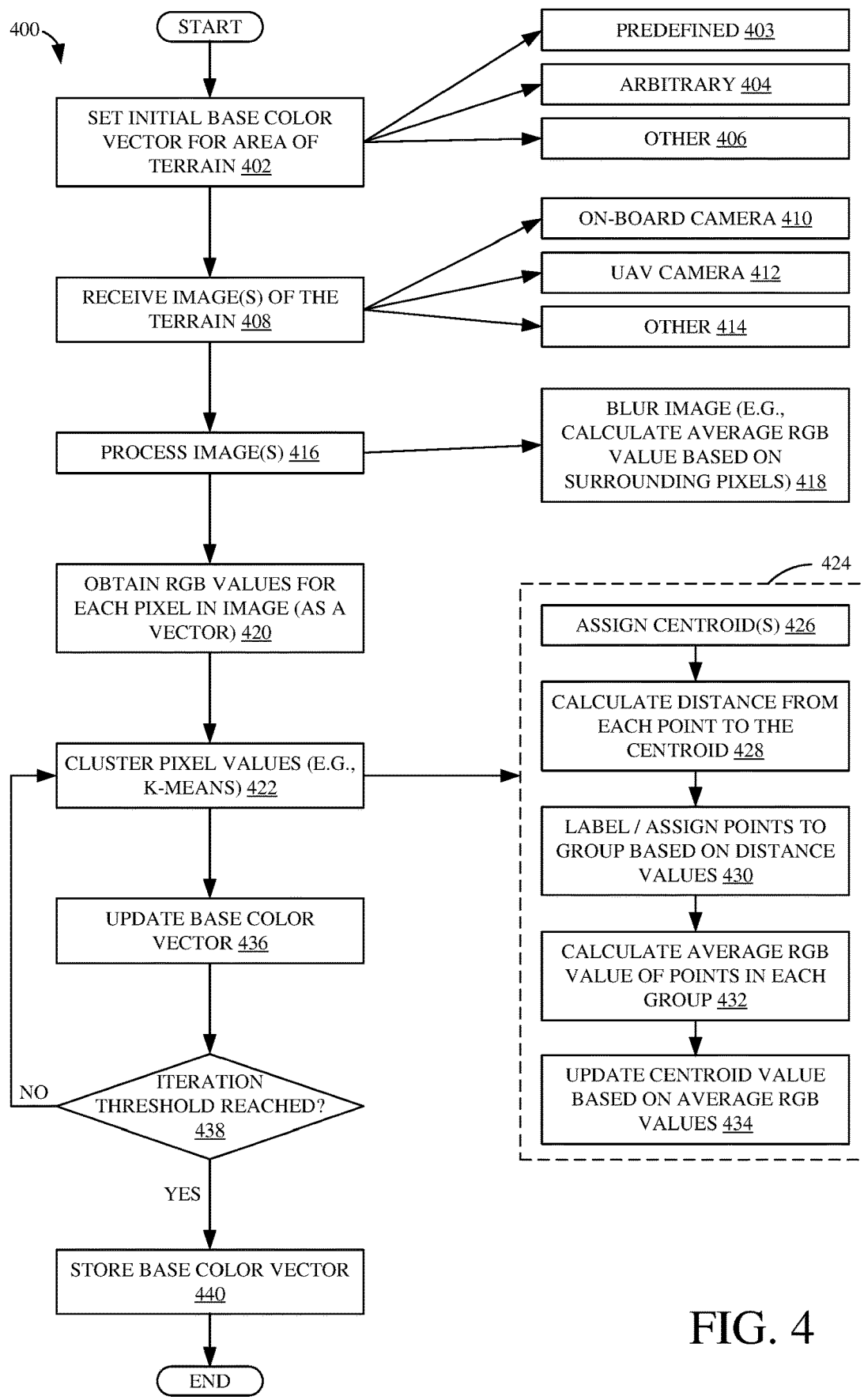
FIG. 4 is a flow diagram of an example method for generating a base spectral response model.

FIG. 3 is a flow diagram illustrating one example of a method performed by the computing system architecture in FIG. 1. At block 302, a base spectral response model is generated by model generation logic 178. An example of generation of a base model is discussed above with respect to FIG. 4. Briefly, the base spectral response model represents expected or normal characteristics of the terrain to be traversed by machine 102. The base model generation can be done for an entire field (e.g., once per field) (block 304) or for portions of a field (block 306). Also, the base model can be continuously updated as machine 102 traverses the field and images are captured by system 140 and processed by image analysis system 142. This is represented by block 308.

At block 310, an image of a portion of the field in a path of machine 102 is received. For example, as noted above, this can comprise an image received from an onboard camera (block 312) mounted on or otherwise carried by machine 102. In one example, the image is received from a UAV, or other machine. This is represented by block 314. For instance, a UAV can be controlled to fly directly ahead of machine 102 (e.g., several meters) and capture images of the terrain. The images can be received in other ways as well. This is represented by block 316. For instance, satellite images can be received from a satellite-based system.

At block 318, the received image is processed, for example by performing spectral analysis to determine an image color vector. This is represented by block 320. At block 322, a distance between the spectral response from the received image and the base spectral response model generated at block 302 is calculated. One example of image distance calculation is discussed below with respect to FIG. 5. Briefly, a distance between an image color vector (e.g., an RGB color vector) and a base color vector is determined. This is represented by block 324.

Further, the distance calculation can include applying a tuning or weighting factor to the calculated image distance. This is represented by block 326. As noted above, this can include one or more of an historical precipitation factor 328 or a relative elevation factor 330.

At block 332, the calculated image distance is compared to a distance threshold calculated or otherwise determined by logic 180. This can be, for example a pre-defined distance value or a distance value that is dynamically updated during operation of architecture 100.

At block 334, machine 102 is controlled based on the comparison at block 332. This includes, in one example, warning generation logic 144 controlling mechanisms 116 to generate a warning that is displayed or otherwise rendered to operation 120. This is represented by block 336. Alternatively, or in addition, control logic 146 controls one or more controllable subsystems 114 based on the comparison at block 332. For instance, propulsion system 130 can be configured to adjust a speed of work machine 102 and/or steering subsystem 132 can be configured to steer machine 102 to change its current heading. This is represented by block 338.

In another example, machine 102 can be controlled to send the image data and/or results of the comparison to remote system 152, for further analysis and/or storage. This is represented at block 340. Also, the distance thresholds can be adjusted. This is represented by block 342.

At block 344, the base model can optionally be updated based on the received image and the processing and distance calculations.

At block 346, the method determines whether there are additional images for a subsequent area to the processed. If so, the method returns to block 310 in which the subsequent image is received and processed.

Figure 5:
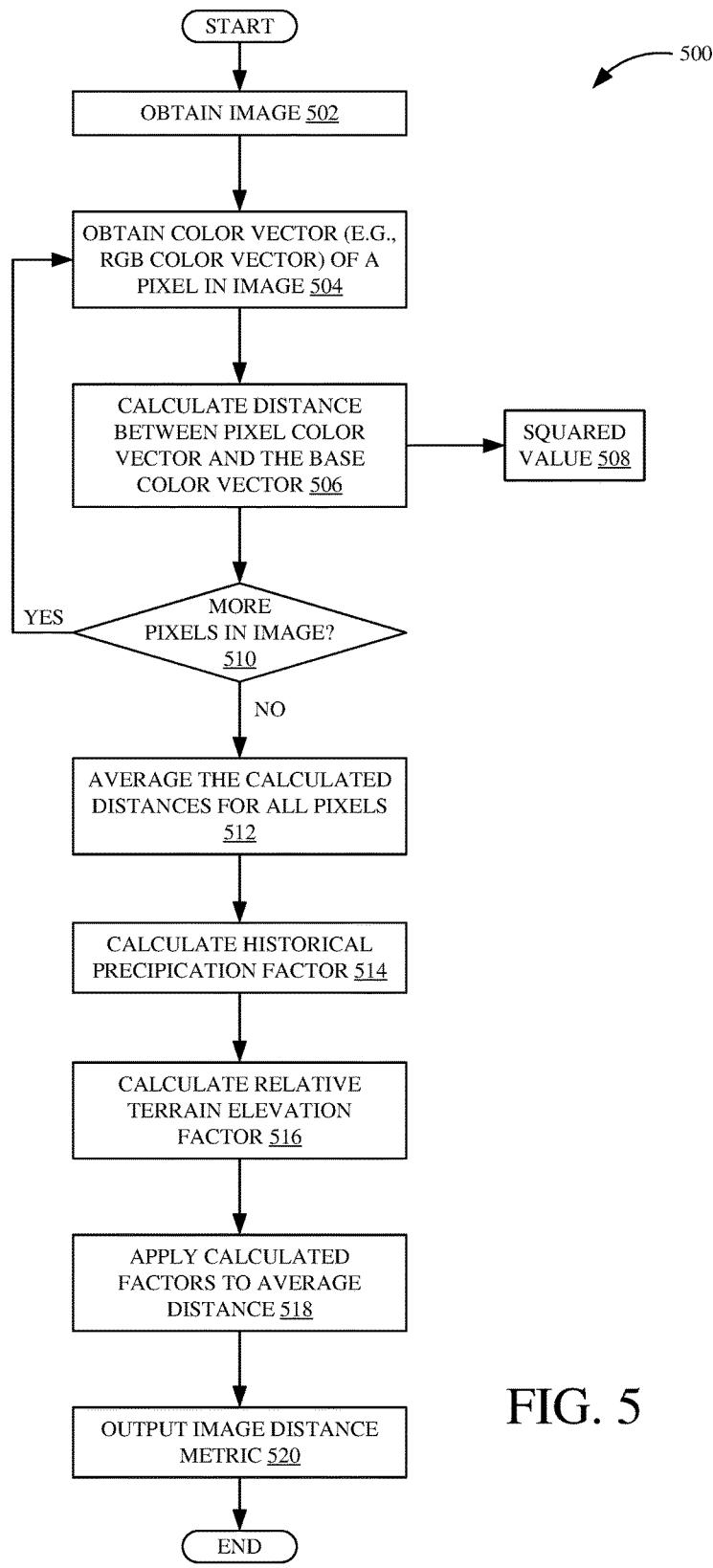
FIG. 5 is a flow diagram of an example method for calculating an image distance.

FIG. 5 is a flow diagram illustrating one example of a method 500 for calculating image distance. For sake of illustration, but not by limitation, method 500 will be described in the context of system 142 obtaining an image 166 from system 140.

At block 502, image 166 is obtained from system 140. At block 504, a color vector (e.g., an RGB color vector) of a particular pixel in the image is obtained. At block 506, a distance between each pixel color vector in the image and the base color vector is calculated. This can include, in one example, obtained a squared value between the pixel RGB value and the base vector RGB value. One example is illustrated below in Equation 1.

$$\text{Distance Value}(DV) = \sqrt{((P_r - B_r)^2 + (P_g - B_g)^2 + (P_b - B_b)^2)}, \quad \text{Eq}(1)$$

where Pr is the red value of the pixel color vector, Br is the red value of the base color vector, Pg is the green value of the pixel color vector, Bg is the green value of the base color vector, where Pb is the blue value of the pixel color vector, and Bb is the blue value of the base color vector.

For sake of illustration, assume a [0,255,0] RGB base color vector is applied to a pixel under consideration having a [0,0,0] RGB color vector. In this case, Equation 1 yields a distance value of 255.

At block 510, the method determines whether there are any more pixels in the image for which to calculate distance. If so, the method returns to block 504 for the additional pixel. Once the distance of all pixels has been calculated, the method proceeds to block 512 in which the calculated distance for all the pixels is averaged, to obtain an average distance. This averaged distance is indicative of a measure of variation of the whole image from the base vector.

At blocks 514, 516, and 518, tuning factors are calculated and applied to the average distance value of the pixels in the image, to obtain a overall distance metric for the image. Illustratively, this includes calculating a historical precipitation factor, at block 514, based on historical precipitation data 192 that is geo-referenced to the location of the terrain represented in the captured image. An example for calculating the precipitation factor is shown below in Equation 2.

$$\text{Factor}(R) = \frac{0.1*R(D-3) + 0.3*R(D-2) + 0.6*R(D-1)}{R(avg)}, \quad \text{Eq (2)}$$

where R(D−1) is the rainfall (e.g., measured in inches) one day prior to the current day (corresponding to capture of the image), R(D−2) is the rainfall two days prior to the current day, R(D−3) is the rainfall three days prior to the current day, and R(avg) is the average rainfall for the given month (or other suitable time period).

A higher value of the precipitation factor indicates a higher possibility of standing water or mud, and increases the distance value for subsequent threshold comparison.

At block 516, a relative terrain elevation factor is calculated based on georeferenced terrain elevation data 190. That is, based on geographic information associated with image 166, logic 186 extracts elevation data for coordinates of the images (or portion of the image). Further, elevation data for the terrain surrounding the portion of the terrain that is the subject of the image under consideration is also obtained. For example, this can include obtaining elevation data for the surrounding field (e.g., all land within a pre-defined radius of the coordinates of the image 166). An example for generating the relative terrain elevation factor is shown below in Equation 3.

$$\text{Factor}(Elev) = \frac{Avg(\sum \text{All GPS Elevation Data for field})}{\text{Elevation Data for GPS Coordinate for image under consideration}}, \quad \text{Eq (3)}$$

A smaller elevation factor indicates that the elevation of the coordinates of the image is relatively higher compared to the average elevation of the surrounding terrain. As such, there is a smaller possibility of standing water as the portion of the terrain is higher relative to the surrounding terrain. This lowers the image distance metric for subsequent threshold comparison.

At block 520, the image distance metric is outputted, for example to control system 112. Based on a determination that the image distance metric is above the threshold, control logic 146 generates warnings or alerts to operator 120 or otherwise controls machine 102 accordingly.

Figure 6:
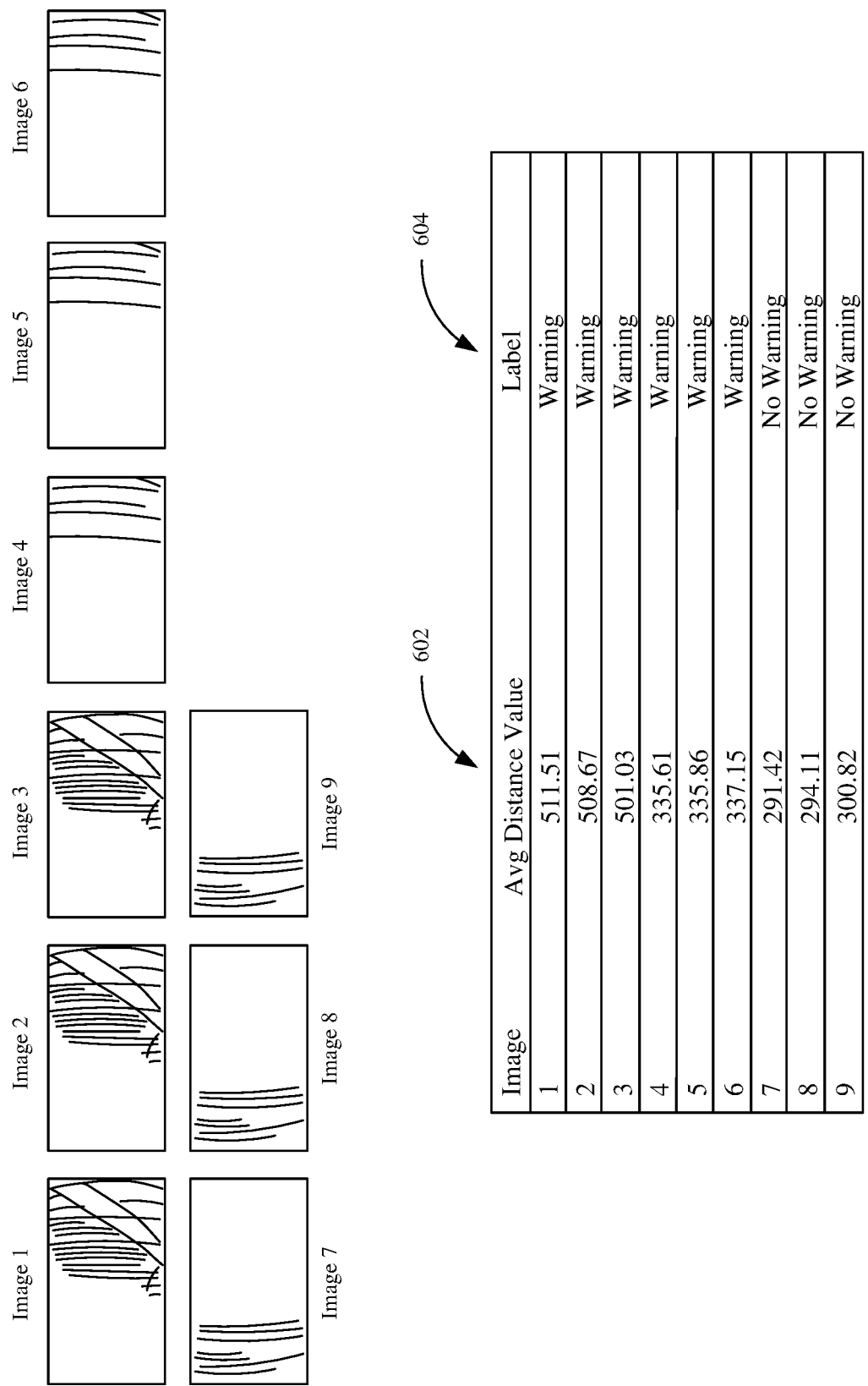
FIG. 6 illustrates example images and corresponding distance values.

FIG. 6 illustrates a set of example images and corresponding image analysis results. Each of images 1-9 are obtained for different areas of a field, and are processed by image analysis system 142 to generate average distance values 602. Each average distance value 602 is compared to a threshold (illustratively a distance value of 300). Based on this comparison, the system determines whether a warning is to be generated for the portion of the terrain represented by the corresponding image. This is represented by labels 604.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
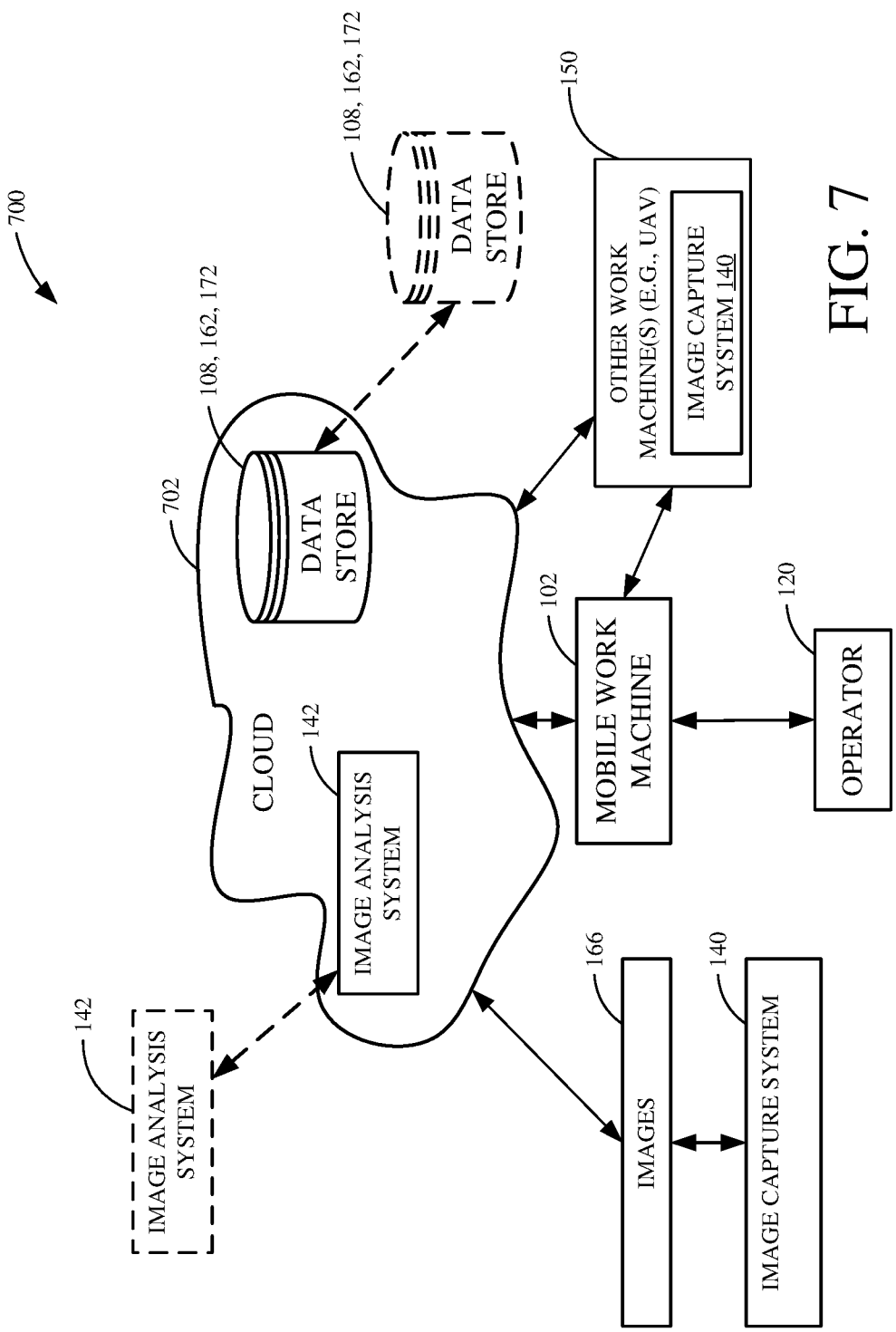
FIG. 7 is a block diagram showing one example of the architecture illustrated in FIG. 1, deployed in a remote server environment.

FIG. 7 is a block diagram of architecture 100, shown in FIG. 1, deployed in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 1 and they are similarly numbered. FIG. 7 specifically shows that image analysis system 142 can be located at a remote server location 702. Therefore, machine 102 accesses those systems through remote server location 702.

FIG. 7 also depicts another example of a remote server architecture. FIG. 7 shows that it is also contemplated that some elements of FIG. 1 are disposed at remote server location 702 while others are not. By way of example, system 142 can be disposed at a location separate from location 702, and accessed through the remote server at location 702. Further, one or more of data stores 108, 162, and 172 can be disposed at a location separate from location 702, and accessed through the remote server at location 702. Regardless of where they are located, they can be accessed directly by machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As machine 102 comes close to the fuel truck for fueling, the system automatically collects the information from machine 102 or transfers information to machine 102 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on machine 102 until machine 102 enters a covered location. Machine 102, itself, can then send and receive the information to/from the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
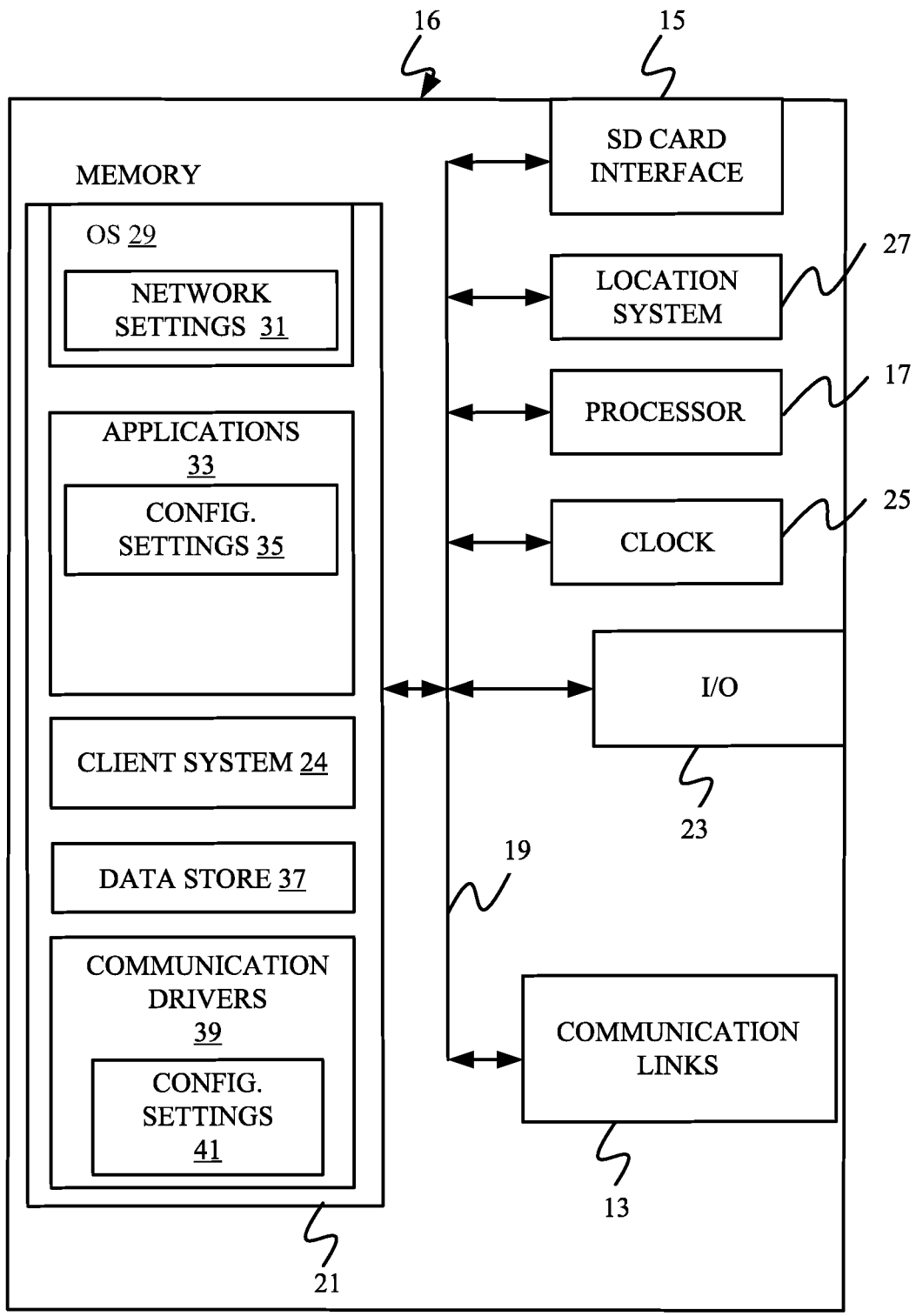
FIGS. 8-10 show examples of mobile devices that can be used in the architectures shown in the previous figures.
Figure 9:
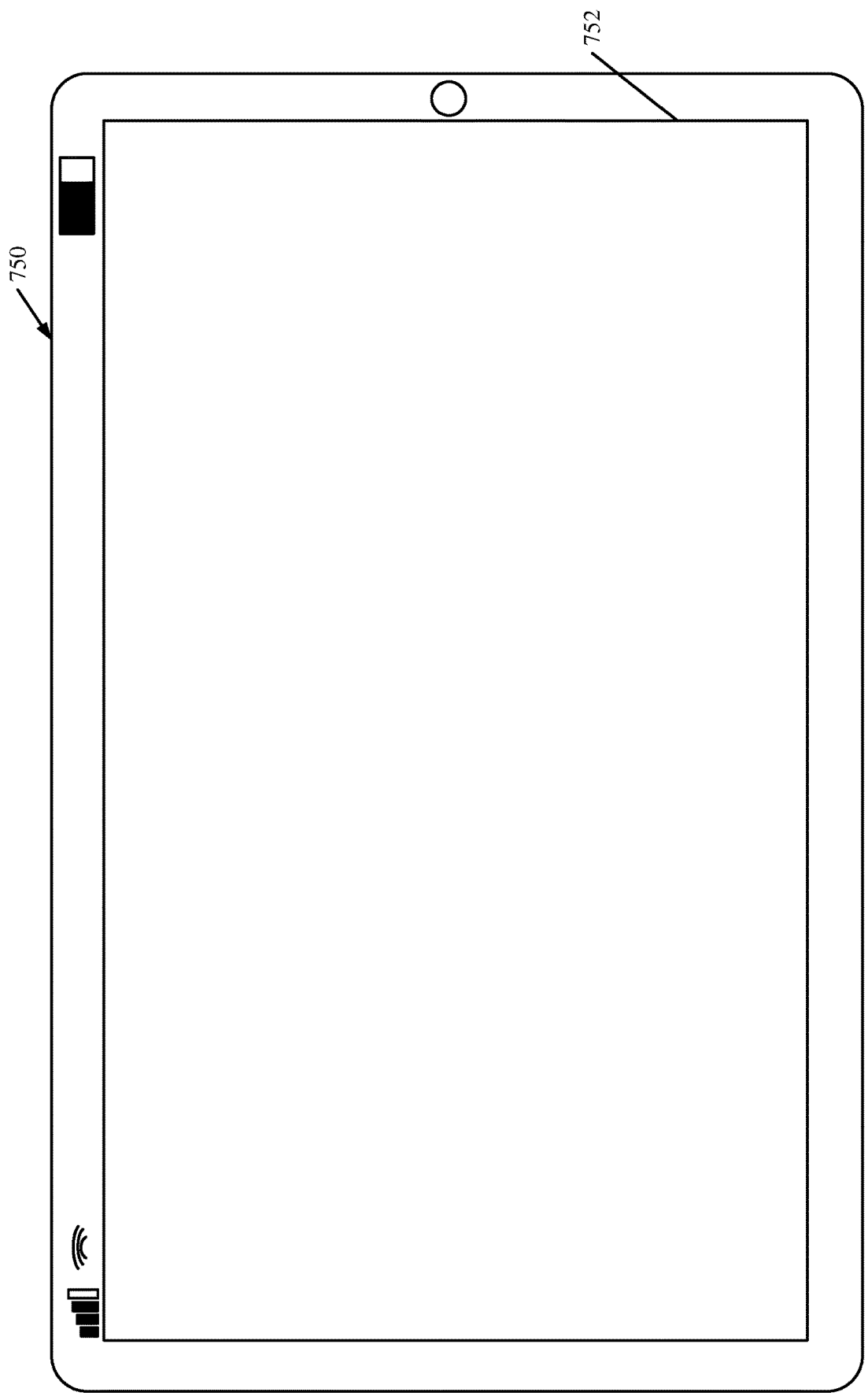
Figure 10:
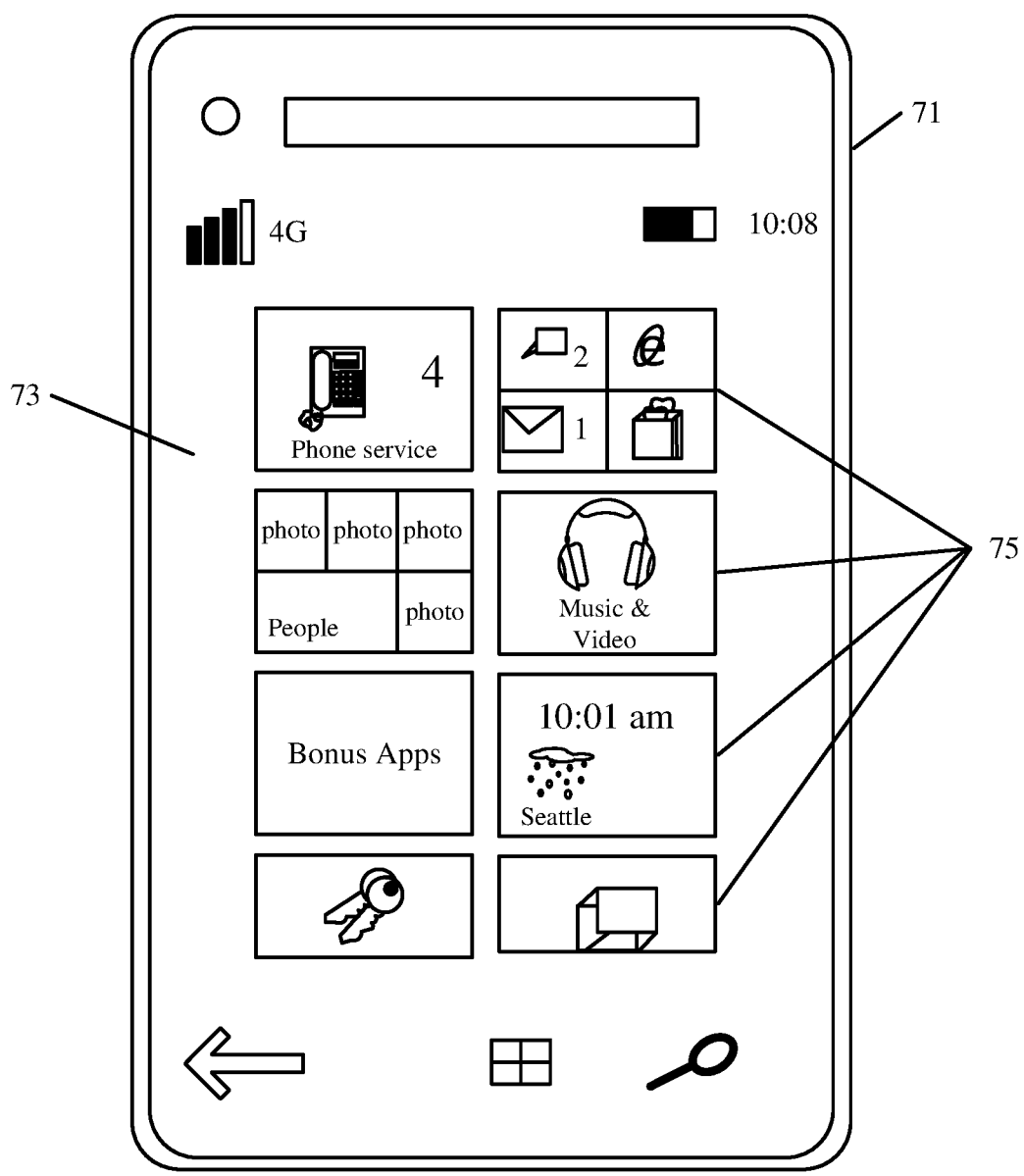

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 102. FIGS. 9-10 are examples of handheld or mobile devices.

FIG. 8 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 750. In FIG. 9, computer 750 is shown with user interface display screen 752. Screen 752 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 750 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
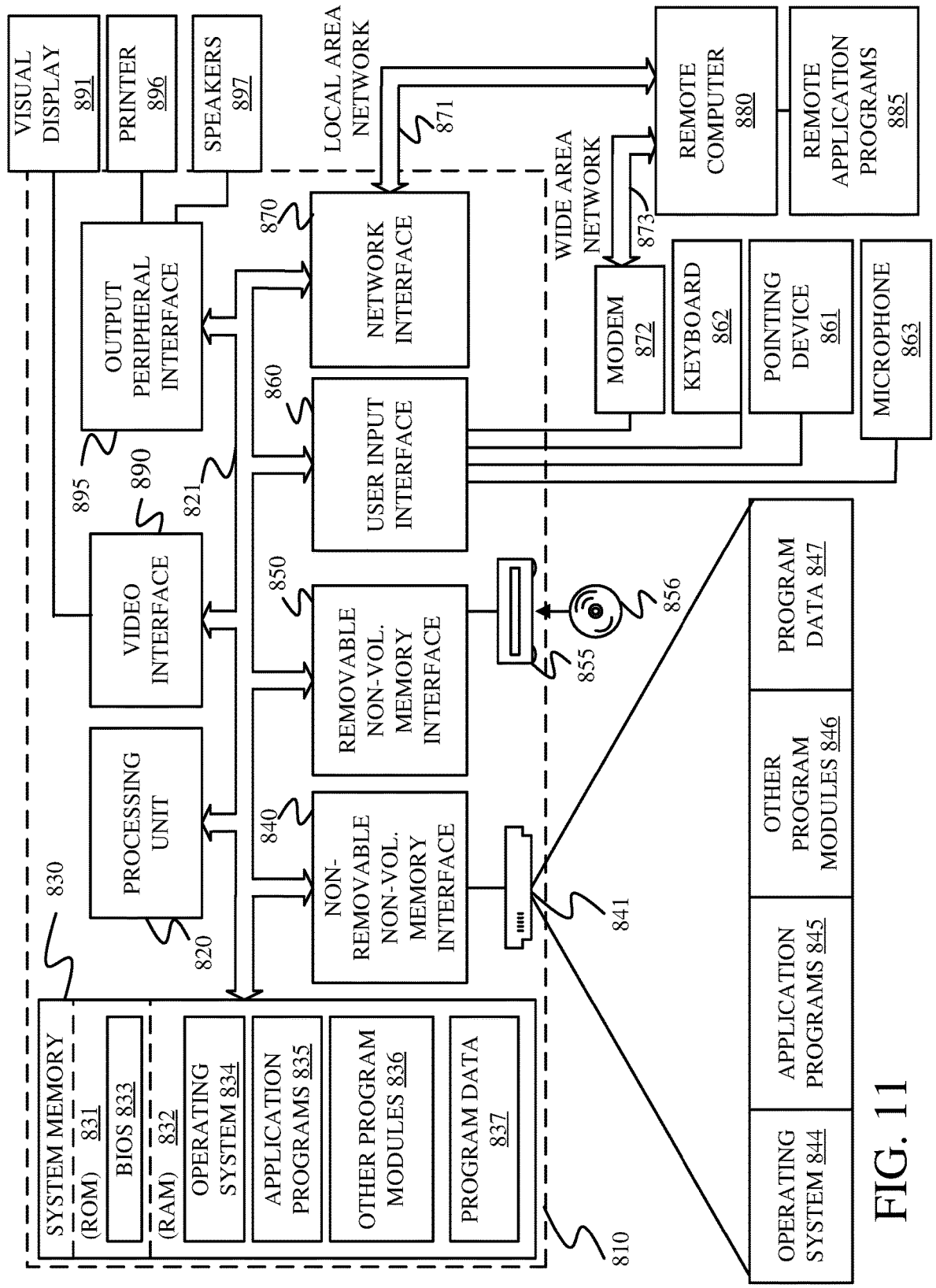
FIG. 11 is a block diagram showing one example of a computing environment that can be used in the architectures shown in the previous figures.

FIG. 11 is one example of a computing environment in which elements of FIG. 1, or parts of it, (for example) can be deployed. With reference to FIG. 11, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network—WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a method of controlling a work machine, the method comprising:

receiving an image of spectral response at an area of terrain corresponding to a path of the mobile work machine;

generating an image distance metric based on a distance between the spectral response and a base spectral response model corresponding to the terrain;

comparing the image distance metric to a distance threshold; and controlling a controllable subsystem of the mobile work machine based on the comparison.

Example 2 is the method of any or all previous examples, wherein the terrain comprises a field and the mobile work machine comprises an agricultural machine configured to perform an agricultural operation on the field.

Example 3 is the method of any or all previous examples, wherein the image is captured by an unmanned aerial vehicle (UAV).

Example 4 is the method of any or all previous examples, wherein the base spectral response model comprises a base color vector, and generating the image distance metric comprises:
 determining an image color vector for the received image, and
 determining a distance between the image color vector and the base color vector.

Example 5 is the method of any or all previous examples, and further comprising:
 determining a plurality of pixel color vectors, each pixel color vector representing a pixel from the image;
 determining a plurality of color vector distances, each representing a distance between one of the pixel color vectors and the base color vector; and
 generating the image distance metric based on the plurality of color vector distances.

Example 6 is the method of any or all previous examples, wherein generating the image distance metric comprises averaging the plurality of color vector distances.

Example 7 is the method of any or all previous examples, and further comprising:
 generating a precipitation factor based on historical precipitation data corresponding to the terrain, and
 generating the image distance metric based on:
  the determined distance between the image color vector and the base color vector, and
  the precipitation factor.

Example 8 is the method of any or all previous examples, wherein the precipitation factor is generated based on measured precipitation values corresponding to a time period prior to a time at which the image was captured.

Example 9 is the method of any or all previous examples, and further comprising:
 generating a terrain elevation factor based on terrain elevation data corresponding to the terrain, and
 generating the image distance metric based on:
  the determined distance between the image color vector and the base color vector, and
  the terrain elevation factor.

Example 10 is the method of any or all previous examples, wherein the area comprises a first area, and the terrain elevation factor is generated based on an elevation of the first area relative to an elevation of a second area of the terrain.

Example 11 is the method of any or all previous examples, and further comprising updating the base color vector based on the determined color vector.

Example 12 is the method of any or all previous examples, wherein controlling a controllable subsystem of the mobile work machine comprises:

controlling a user interface mechanism to render an indication of a terrain condition in a path of the mobile work machine.

Example 13 is the method of any or all previous examples, wherein controlling a controllable subsystem of the mobile work machine comprises automatically controlling at least one of a propulsion system or a steering system of the mobile work machine.

Example 14 is a mobile work machine comprising:
 a communication system configured to receive an image of spectral response at an area of terrain corresponding to a path of the mobile work machine;
 a controllable subsystem;
 an image analysis system configured to:
  generate an image distance metric based on a distance between the spectral response and a base spectral response model corresponding to the terrain; and
  compare the image distance metric to a distance threshold;
 a control system configured to control the controllable subsystem of the work machine based on the comparison.

Example 15 is the mobile work machine of any or all previous examples, wherein
 the base spectral response model comprises a base color vector, and
 the image analysis system is configured to generate image distance metric by determining an image color vector for the received image, and determining a distance between the image color vector and the base color vector.

Example 16 is the mobile work machine of any or all previous examples, wherein the image analysis system is configured to:
 determine a plurality of pixel color vectors, each pixel color vector representing a pixel from the image;
 determine a plurality of color vector distances, each representing a distance between one of the pixel color vectors and the base color vector; and
 generate the image distance metric based on the plurality of color vector distances.

Example 17 is the mobile work machine of any or all previous examples, wherein the image distance metric is generated based on an average of the plurality of color vector distances.

Example 18 is the mobile work machine of any or all previous examples, wherein the image analysis system is configured to:
 generate a precipitation factor based on historical precipitation data corresponding to the terrain, and
 generate the image distance metric based on:
  the determined distance between the image color vector and the base color vector, and
  the precipitation factor.

Example 19 is the mobile work machine of any or all previous examples, wherein the image analysis system is configured to:
 generate a terrain elevation factor based on terrain elevation data corresponding to the terrain, and
 generate the image distance metric based on:
  the determined distance between the image color vector and the base color vector, and
  the terrain elevation factor.

Example 20 is an agricultural machine comprising:
 a controllable subsystem configured to perform an agricultural operation on a field;
 a communication system configured to receive an image of spectral response at an area of the field;

an image analysis system configured to:
  generate an image distance metric based on a distance between the spectral response and a base spectral response model corresponding to the terrain; and
  compare the image distance metric to a distance threshold;
a control system configured to generate a control signal that controls the agricultural machine based on the comparison.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a mobile agricultural machine, the method comprising:
  receiving an image of spectral response at an area of a field corresponding to a path of the mobile agricultural machine that traverses the field to perform an agricultural operation, wherein the mobile agricultural machine includes ground-engaging traction elements configured to propel the mobile agricultural machine over the field;
  generating an image distance metric based on a distance between the spectral response and a base spectral response model comprising a base color vector corresponding to the field, wherein generating the image distance metric comprises:
    determining an image color vector for the received image, and
    determining a distance between the image color vector and the base color vector;
  comparing the image distance metric to a distance threshold;
  identifying a field condition of the field based on the comparison; and
  controlling, based on the field condition, a controllable subsystem of the mobile agricultural machine during the agricultural operation.

2. The method of claim 1, wherein the image is captured by an unmanned aerial vehicle (UAV).

3. The method of claim 1, and further comprising:
  determining a plurality of pixel color vectors, each pixel color vector representing a pixel from the image;
  determining a plurality of color vector distances, each representing a distance between one of the pixel color vectors and the base color vector; and
  generating the image distance metric based on the plurality of color vector distances.

4. The method of claim 3, wherein generating the image distance metric comprises averaging the plurality of color vector distances.

5. The method of claim 1, and further comprising:
  generating a precipitation factor based on historical precipitation data corresponding to the field, and
  generating the image distance metric based on:
    the determined distance between the image color vector and the base color vector, and
    the precipitation factor.

6. The method of claim 1, wherein the field condition comprises a soil condition.

7. The method of claim 1, and further comprising:
  generating a field elevation factor based on field elevation data corresponding to the field, and
  generating the image distance metric based on:
    the determined distance between the image color vector and the base color vector, and
    the field elevation factor.

8. The method of claim 7, wherein the area comprises a first area, and the field elevation factor is generated based on an elevation of the first area relative to an elevation of a second area of the field.

9. The method of claim 1, and further comprising updating the base color vector based on the determined image color vector.

10. The method of claim 1, wherein controlling a controllable subsystem of the mobile agricultural machine comprises:
  controlling a user interface mechanism to render an indication of a field condition in a path of the mobile agricultural machine.

11. The method of claim 1, wherein controlling a controllable subsystem of the mobile agricultural machine comprises automatically controlling at least one of a propulsion system or a steering system of the mobile agricultural machine.

12. A mobile work machine comprising:
  a communication system configured to receive an image of spectral response at an area of terrain corresponding to a path of the mobile work machine;
  a controllable subsystem;
  an image analysis system configured to:
    determine an image color vector for the received image;
    determine a distance between the image color vector and a base color vector corresponding to the terrain;
    generate an image distance metric based on the determined distance between the spectral response and the base color vector; and
    compare the image distance metric to a distance threshold; and
  a control system configured to control the controllable subsystem of the mobile work machine based on the comparison.

13. The mobile work machine of claim 12, wherein
  the terrain comprises an agricultural field,
  the mobile work machine comprises a mobile agricultural machine having ground- engaging traction elements configured to propel the mobile agricultural machine over the agricultural field, and
  the control system is configured to:
    identify a field condition of the agricultural field based on the comparison; and
    control the controllable subsystem of the mobile agricultural machine based on the field condition.

14. The mobile work machine of claim 12, wherein the image analysis system is configured to:
  determine a plurality of pixel color vectors, each pixel color vector representing a pixel from the image;
  determine a plurality of color vector distances, each representing a distance between one of the pixel color vectors and the base color vector; and
  generate the image distance metric based on the plurality of color vector distances.

15. The mobile work machine of claim 14, wherein the image distance metric is generated based on an average of the plurality of color vector distances.

16. The mobile work machine of claim 12, wherein the image analysis system is configured to:
  generate a precipitation factor based on historical precipitation data corresponding to the terrain, and generate the image distance metric based on:
   the determined distance between the image color vector and the base color vector, and
   the precipitation factor.

17. The mobile work machine of claim 12, wherein the image analysis system is configured to:
generate a terrain elevation factor based on terrain elevation data corresponding to the terrain, and
generate the image distance metric based on:
   the determined distance between the image color vector and the base color vector, and
   the terrain elevation factor.

18. An agricultural machine comprising:
a controllable subsystem configured to perform an agricultural operation on a field;
ground-engaging traction elements configured to propel the agricultural machine over the field;
a communication system configured to receive an image of spectral response at an area of the field;
an image analysis system configured to:
   generate an image distance metric based on a distance between the spectral response and a base spectral response model comprising a base color vector corresponding to the field, wherein the image analysis system is configured to generate the image distance metric by determining an image color vector for the received image and determining a distance between the image color vector and the base color vector;
   compare the image distance metric to a distance threshold; and
   identify a field condition of the field based on the comparison; and
a control system configured to generate a control signal that controls the agricultural machine based on the field condition.

* * * * *